United States Patent
Snyder et al.

(10) Patent No.: US 8,403,016 B2
(45) Date of Patent: Mar. 26, 2013

(54) MANDREL WITH SLIDING EXTERIOR PROJECTION

(76) Inventors: Kevin Snyder, Blue Jay, CA (US);
Dennis Diem, Long Beach, CA (US);
Jeffrey Hynes, Pasadena, CA (US)

( * ) Notice: Subject to any disclaimer, the term of this patent is extended or adjusted under 35 U.S.C. 154(b) by 73 days.

(21) Appl. No.: 13/204,468

(22) Filed: Aug. 5, 2011

(65) Prior Publication Data

US 2013/0032279 A1  Feb. 7, 2013

(51) Int. Cl.
*B29C 65/00* (2006.01)

(52) U.S. Cl. ........ 156/446; 156/184; 156/187; 156/443; 425/403

(58) Field of Classification Search .................. 156/169, 156/171–175, 184, 185, 187–195, 443, 446–458
See application file for complete search history.

(56) References Cited

U.S. PATENT DOCUMENTS

| | | |
|---|---|---|
| 3,675,376 A | 7/1972 | Belew |
| 3,757,718 A | 9/1973 | Johnson |
| 3,757,827 A | 9/1973 | Seiwert et al. |
| 4,308,225 A | 12/1981 | Magarian |
| 4,405,546 A | 9/1983 | Jakobsen et al. |
| 5,145,621 A | 9/1992 | Pratt |
| 5,348,602 A | 9/1994 | Makarenko et al. |
| 5,597,435 A | 1/1997 | Desautels |
| 7,112,054 B2 | 9/2006 | Frantz et al. |
| 7,335,012 B2 | 2/2008 | Blanton et al. |
| 7,431,978 B2 | 10/2008 | Blanton et al. |
| 2009/0176026 A1 | 7/2009 | Froeschner |

OTHER PUBLICATIONS

International Search Report and Written Opinion in PCT/US2012/029771, dated Jul. 10, 2012.

*Primary Examiner* — Katarzyna Wyrozebski Lee
*Assistant Examiner* — Carson Gross
(74) *Attorney, Agent, or Firm* — Sheldon Mak & Anderson

(57) ABSTRACT

A mandrel suitable for forming a hollow part from a heat curable material includes an (a) an elongate central member having a coefficient of expansion which is different than the coefficient of expansion of the cured heat curable material, (b) at least one lateral member disposed at a first location and projecting away from the outer surface of the central member, the lateral member being slidably attached to the central member, and (c) a rigid elongate strut member having a coefficient of expansion substantially similar to the coefficient of expansion of the cured heat curable material. The first end of the strut member is affixed to the lateral member, and the second end of the strut member is affixed spaced apart from the lateral member.

7 Claims, 3 Drawing Sheets

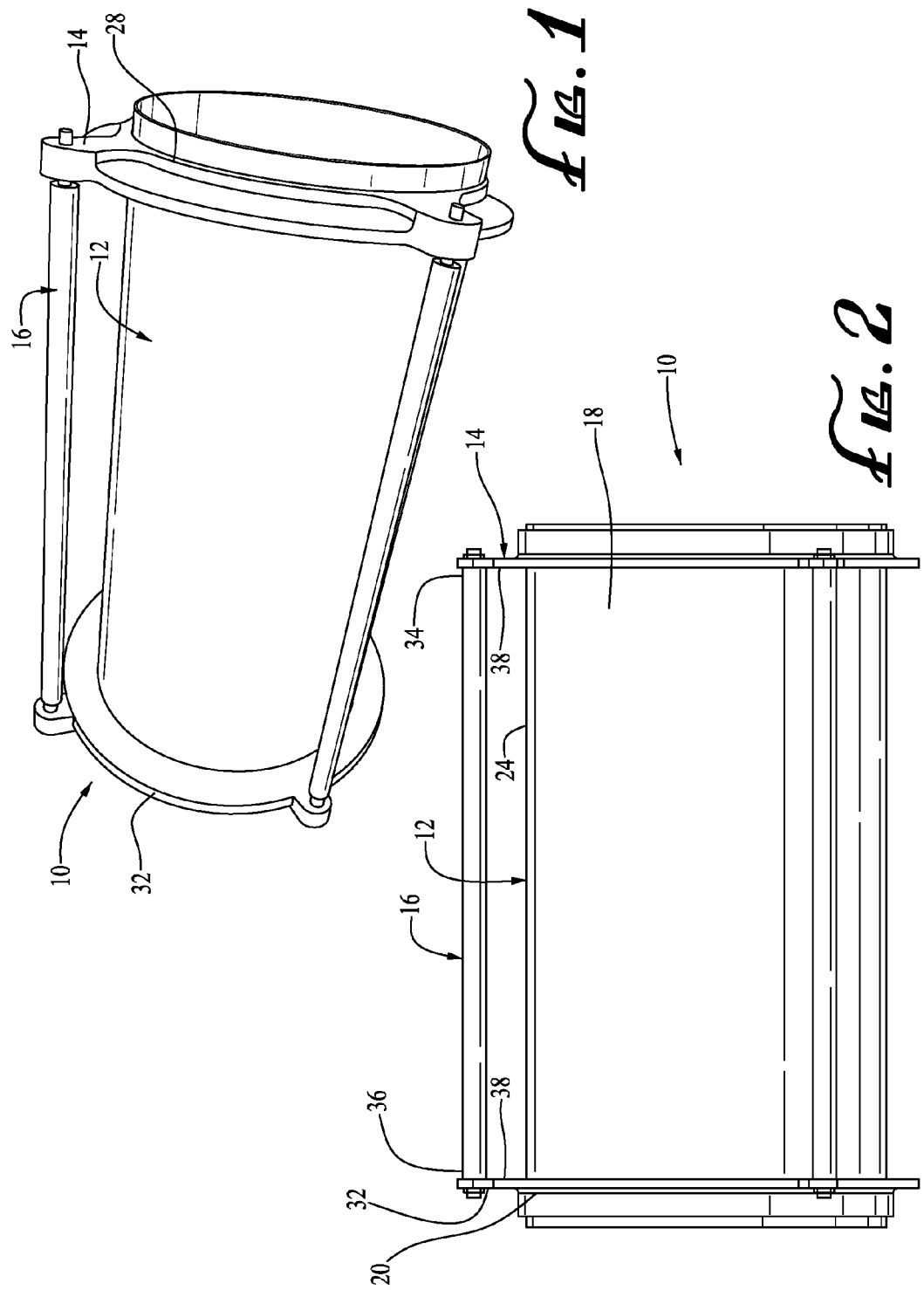

MANDREL WITH SLIDING EXTERIOR PROJECTION

FIELD OF THE INVENTION

This invention relates generally to mandrels for forming hollow parts from a heat curable material.

BACKGROUND OF THE INVENTION

Elongate hollow machine parts are increasingly constructed from non-metal materials, such as composite materials. Typically, such composite materials are constructed by a heat curing process.

In such heat curing processes, it is typical to form the machine parts by applying heat curable material to the exterior of a mandrel, curing the non-metal material, cooling the cured non-metal material—while the part remains supported by the mandrel—and, finally, removing the finished part from the mandrel.

A problem arises when the part is to have a lateral projection, such as a flange. Since mandrels are typically made from steel, and therefore have a much larger coefficient of thermal expansion than the non-metal material. The mandrel, including the lateral member on the mandrel used to support the lateral projection, expands at a greater rate than the composite part. This causes a gap to form between the lateral portion (on the composite part) and the lateral member (on the mandrel), thereby resulting in a reduction of supporting pressure between the lateral projection and the lateral member. This, in turn, may cause the lateral projection of the non-metal part to prematurely disengage from the support provided by the lateral member. Such premature disengagement frequently leads to porosity, delaminations and/or other laminate quality problems in the non-metal part.

Another problem which arises when a composite part is to have a lateral projection is that the lateral member on the mandrel can crush the lateral projections during cool-down.

In an attempt to deal with these problems, some prior art mandrels have been designed with "floating" lateral members—lateral members free to slide along the exterior of the central portion of the mandrel. While such floating lateral members generally succeed in solving the tendency of the lateral members to crush the lateral projections during cool-down, the final disposition of the lateral members cannot be accurately controlled. This means that the location of the lateral projections on the composite part cannot be accurately controlled.

Accordingly, there is a need for a mandrel capable of forming a machine part having a lateral projection which avoids the aforementioned problems in the prior art.

SUMMARY OF THE INVENTION

The invention satisfies this need. The invention is a mandrel suitable for forming a hollow part, wherein the part is made from a heat curable material having a first coefficient of expansion, has an elongate body with a longitudinal axis and has a lateral projection attached to the body which extends away from the body, the mandrel comprising (a) an elongate central member having a first end, an opposed second end, a longitudinal axis, an outer surface and a second coefficient of expansion which is different than the first coefficient of expansion, (b) a lateral member disposed at a first location and projecting away from the outer surface of the central member, the lateral member being slidably attached to the central member such that the lateral member is slidable along a path parallel to the longitudinal axis of the central member, and (c) a rigid elongate strut member having a first end, a second end and a coefficient of expansion substantially similar to the first coefficient of expansion, the first end of the strut member being affixed to the lateral member and the second end of the strut member being affixed at a second location spaced apart from the first location, the strut member being disposed substantially parallel to the longitudinal axis of the central member.

DRAWINGS

These and other features, aspects and advantages of the present invention will become better understood with reference to the following description, appended claims and accompanying drawings where:

FIG. 1 is a perspective view of a first mandrel having features of the invention;

FIG. 2 is a side view of the mandrel illustrated in FIG. 1;

DETAILED DESCRIPTION OF THE INVENTION

Figure 4:
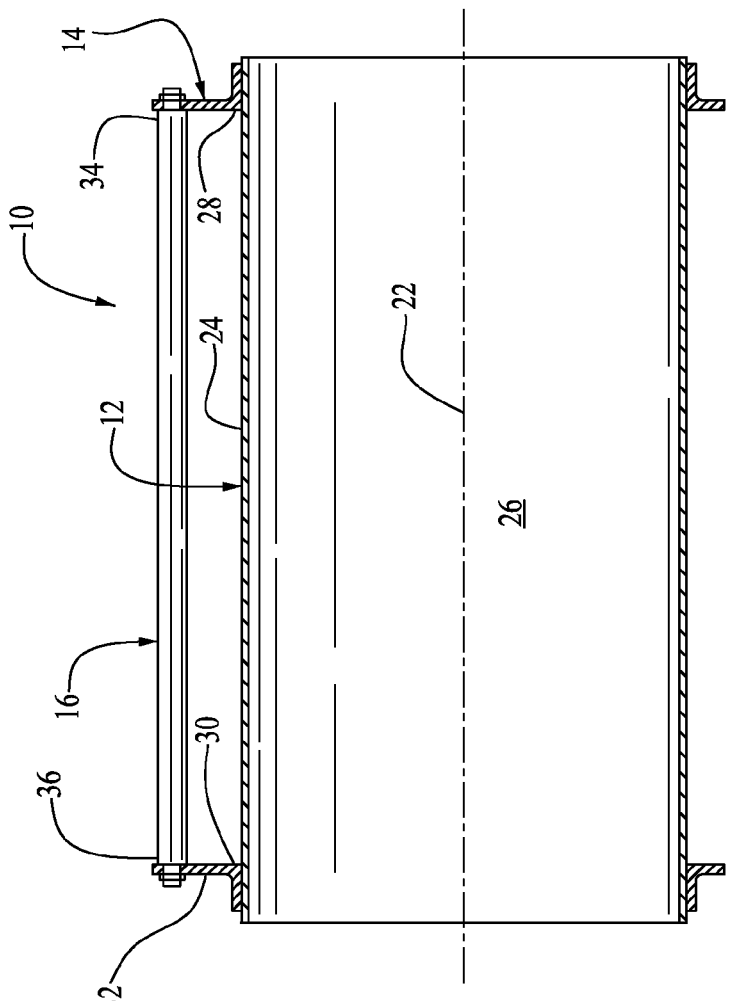
FIG. 4 is a cross-sectional side view of the mandrel illustrated in FIG. 3, taken along line 4-4.
Figure 3:
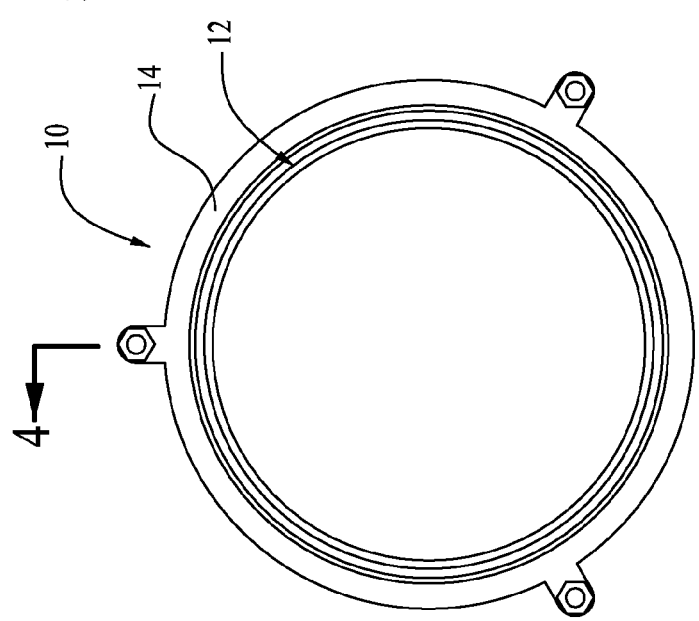
FIG. 3 is an end view of the mandrel illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a mandrel 10 suitable for forming a hollow part, wherein the part is made from a heat curable material having a first coefficient of expansion, an elongate body with a longitudinal axis and has a lateral projection attached to the body which extends away from the body.

The heat curable material can be a composite of a fiber and a matrix. Fiber materials include carbon, graphite, fiberglass, quartz, ceramic, aramid, nanno fiber, UHMWPE, basalt, and other structural reinforced fibers. Matrices can include epoxy, polyimide, bismaleimide, pheolic, thermoplastic, polyester, vinyl ester, cyanate ester, ceramics or other polymeric composite matrix. The fiber and the matrix can be in any combination.

The mandrel 10 comprises an elongate central member 12, one or more movable lateral members 14 and at least one rigid elongate strut member 16.

The central member 12 is elongate and has a first end 18, an opposed second end 20, a longitudinal axis 22 and an outer surface 24. Typically, the central member 12 is between about four feet and about 20 feet in length, most typically between about three feet and about eight feet in length—such as about five feet in length.

Also typically, the central member 12 is made from steel. However, other alloys can be used, such as aluminum or nickel-steel alloys such as Invar®. The central member 12 in many applications can also be made from a carbon reinforced composite or carbon composites.

The central member 12 has a coefficient of expansion which is markedly different than the first coefficient of expansion. The difference in coefficient of expansion would result in detriment during the curing of the composite. Typically, the coefficient of expansion is "markedly different," meaning that the coefficient of expansion of the central member differs from the first coefficient of expansion by at least 5%.

Figure 5:
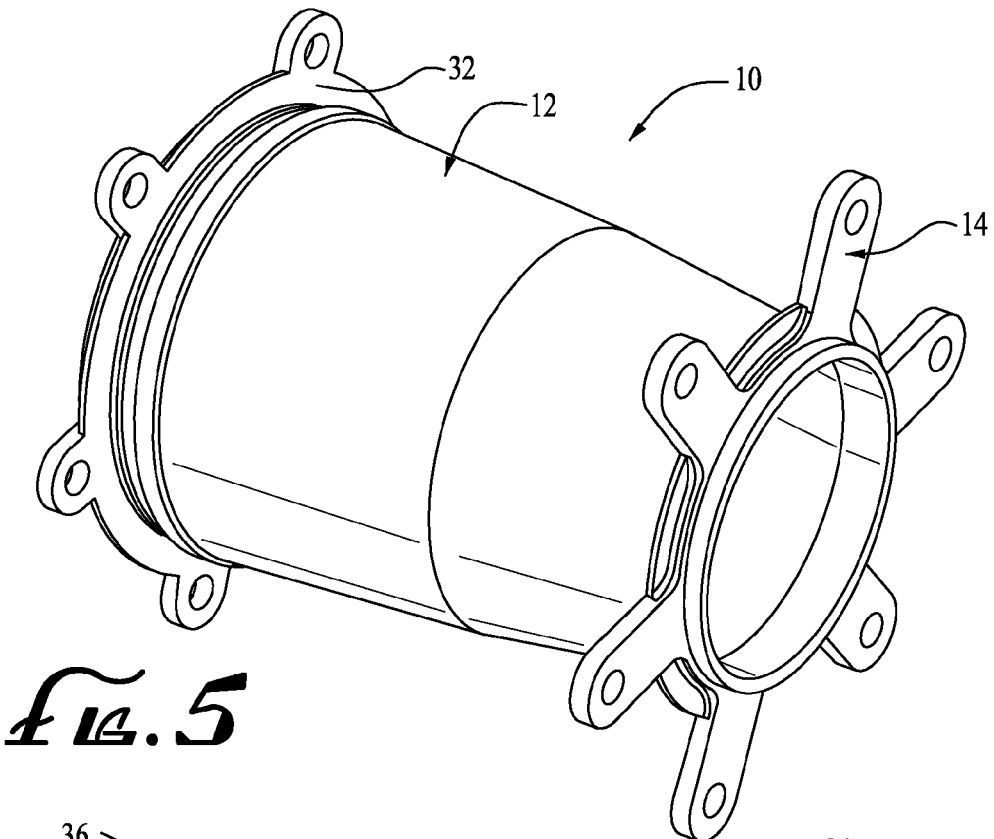
FIG. 5 is a perspective view of a second mandrel having features of the invention.
Figure 6:
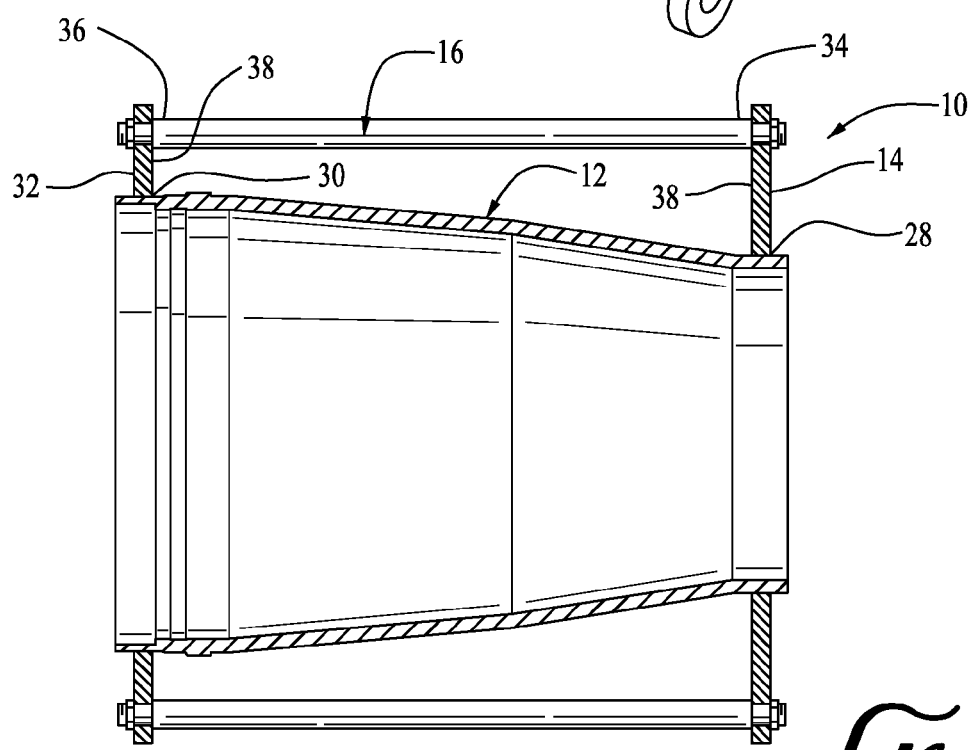
FIG. 6 is a cross-sectional side view of the mandrel illustrated in FIG. 5.

In the embodiments illustrated in the drawings, the outer surface 24 of the central member 12 has circular cross-sections throughout the length of the central member 12. In the embodiments illustrated in FIGS. 1-4, the outer surface 24 of the central member 12 is a right circular cylinder having equal circular cross-sections throughout the length of the central member 12. In the embodiment illustrated in FIGS. 5 and 6, however, the circular cross-sections of the outer surface 24 of the central member 12 is larger at the first end 18 than at the second end 20. The outer surface 24 of the central member 12 can have many other shapes, including shapes having elliptical cross-sections and polygon cross-sections (such as square cross-sections, rectangular cross-sections, octagonal cross-sections, etc.). Central members 12 having irregular cross-sections can also be used in the invention.

In the embodiments illustrated in the drawings, the central member 12 defines an internal passageway 26 having circular cross-sections. In the embodiments illustrated in FIGS. 1-4, the central member 12 defines an internal passageway 26 which is a right circular cylinder, having the same circular cross-sections throughout the length of the central member 12. In the embodiment illustrated in FIGS. 5 and 6, the central member 12 defines an internal passageway 26 having circular cross-sections, but the internal passageway 26 at the first end 18 of the central member 12 is larger in diameter than the passageway at the second end 20.

The lateral member 14 is disposed at a first location 28 and projects away from the outer surface 24 of the central member 12. The lateral member 14 is slidably attached to the central member 12, such that the lateral member 14 is slidable along a path parallel to the longitudinal axis 22 of the central member 12 and in the direction of a second location 30 spaced apart from the first location 28.

Also in the embodiments illustrated in the drawings, the mandrel 10 further comprises a second lateral member 32 disposed at the second location 30 and projecting away from the outer surface 24 of the central member 12. In these embodiments, the second lateral member 32 is slidably attached to the central member 12 such that the second lateral member 32 is slidable along a path substantially parallel to the longitudinal axis 22 of the central member 12. In other embodiments, the second lateral member 32 can be rigidly affixed to the central member 12. Embodiments with a second lateral member 32 allow the mandrels 10 to form parts having opposed lateral projections, such as a pair of opposed end flanges.

The elongate strut member 16 is rigid, has a first end 34, a second end 36 and a coefficient of expansion substantially similar to the first coefficient of expansion. By "substantially similar," it is meant that the coefficient of expansion of the strut member 16 is close enough to cause sufficient positive contact between the part and the lateral member 14 of the mandrel 10 during curing and cool-down of the part to prevent detriment in the finished part. Typically, the elongate strut member 16 has a coefficient of expansion within about 5% of the first coefficient of expansion.

Preferably, the strut member 16 is made from the same material as the part. In such embodiments, the coefficient of expansion is identical to the first coefficient of expansion. However, many other materials can be used to form the strut member 16, so long as the strut member 16 has a coefficient of expansion substantially similar to the first coefficient of expansion. Examples of such other materials include composite materials having fibers of carbon, graphite, fiberglass, quartz, ceramic, aramid, nanno fiber, UHMWPE, basalt, and other structural reinforced fibers, and having matrices of epoxy, polyimide, bismaleimide, pheolic, thermoplastic, polyester, vinyl ester, cyanate ester, ceramics or other polymeric composite matrix.

The first end 34 of the strut member 16 is affixed to the lateral member 14 and the second end 36 of the strut member 16 is affixed at the second location 30. The strut member 16 is disposed substantially parallel to the longitudinal axis 22 of the central member 12.

In the embodiments illustrated in the drawings, the elongate strut member 16 comprises a plurality of rigid elongate strut members 16. In the embodiments illustrated in the FIGS. 1-4, the mandrel 10 comprises three elongate strut members 16. In the embodiment illustrated in FIGS. 5 and 6, the mandrel 10 comprises six elongate strut members 16.

Also in the embodiments illustrated in the drawings, the strut members 16 are affixed at the second location 30 to the slidable second lateral member 14. In other embodiments, the strut members 16 can be affixed to a non-slidable second lateral member disposed at the second location 30. In still other embodiments, the strut member 16 can be attached at the second location 30 to a plate or wall not part of the mandrel 10 but rigidly disposed with respect to the central member 12.

The elongate strut member 16 is typically a solid cylindrical member. In the embodiments illustrated in the drawings, the elongate strut members 16 are right circular cylinders having cross-sectional diameters, typically between about 0.1 inch and about 4 inches.

The invention is also a method of using the mandrel 10 described above. In the method, the mandrel 10 is used to form a hollow part made from a heat curable material having a first coefficient of expansion, wherein the part comprises (i) an elongate body with a first end, a second end and a longitudinal axis, and (ii) a lateral projection attached to the body which extends away from the body, the method comprising the steps of (a) providing the mandrel 10 of the invention, (b) forming the body of the part by applying heat curable material to the outer surface 24 of the central member 12 of the mandrel 10, (c) forming a lateral projection by applying the heat curable material to an inner surface 38 of the lateral member 14, (d) tightly retaining the body of the part and the lateral projection of the part to the mandrel 10 while heating the curable material to an elevated temperature while maintaining contact between the lateral projection and the inner surface of the lateral member 14, and (e) after the part has cured, cooling the part.

The invention solves the problems discussed in the Background Section, above. Because the lateral member 14 is allowed to slide along the central member 12, and because the elongate strut member 16 has a coefficient of expansion substantially similar to the coefficient of expansion of the part being formed with the mandrel 10, in the heating and cooling of the mandrel 10 and the part does not cause a premature disengagement of the part from the lateral member 14 of the mandrel 10. Also, because the lateral member 14 is allowed to slide along the central member 12, there is no danger of the lateral member crushing the lateral projection during cool-down.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A mandrel suitable for forming a hollow part, wherein the part is made from a heat curable material having a first coefficient of expansion, has an elongate body with a longitudinal axis and has a lateral projection attached to the body which extends away from the body, the mandrel comprising:

(a) an elongate central member having a first end, an opposed second end, a longitudinal axis, an outer surface and a second coefficient of expansion which is different from the first coefficient of expansion;

(b) a lateral member disposed at a first location and projecting away from the outer surface of the central member, the lateral member being slidably attached to the central member such that the lateral member is slidable along a path parallel to the longitudinal axis of the central member; and (c) a rigid elongate strut member having a first end, a second end and a coefficient of expansion substantially similar to the first coefficient of expansion, the first end of the strut member being affixed to the lateral member and the second end of the strut member being affixed at a second location spaced apart from the first location, the strut member being disposed substantially parallel to the longitudinal axis of the central member.

2. The mandrel of claim 1 wherein the second end of the strut member is attached to a second lateral member disposed at the second location.

3. The mandrel of claim 1 wherein the rigid elongate strut member comprises a plurality of rigid elongate strut members.

4. The mandrel of claim 1 wherein the second coefficient of expansion is greater than the first coefficient of expansion and wherein the lateral member is slidably attached to the central member such that the lateral member is slidable in the direction of the second location.

5. The mandrel of claim 1 wherein the
lateral member comprises a first lateral member disposed proximate to the first end of the central member and projecting away from the outer surface of the central member and a second lateral member disposed proximate to the second end of the central member and projecting away from the outer surface of the central member, both lateral members being slidably attached to the central member such that both lateral members are slidable along a path parallel to the longitudinal axis of the central member; and wherein the first end of the strut member is affixed to the first lateral member and the second end of the strut member is affixed to the second lateral member.

6. The mandrel of claim 5 wherein the rigid elongate strut member comprises a plurality of rigid elongate strut members.

7. The mandrel of claim 5 wherein the second coefficient of expansion is greater than the first coefficient of expansion and wherein the lateral member is slidably attached to the central member such that the lateral member is slidable in the direction of the second location.

* * * * *